Nov. 7, 1961 L. ECK 3,007,509
TOOL FOR REPAIRING DAMAGED AUTOMOBILE BODIES, ETC.
Filed June 18, 1958 2 Sheets-Sheet 1
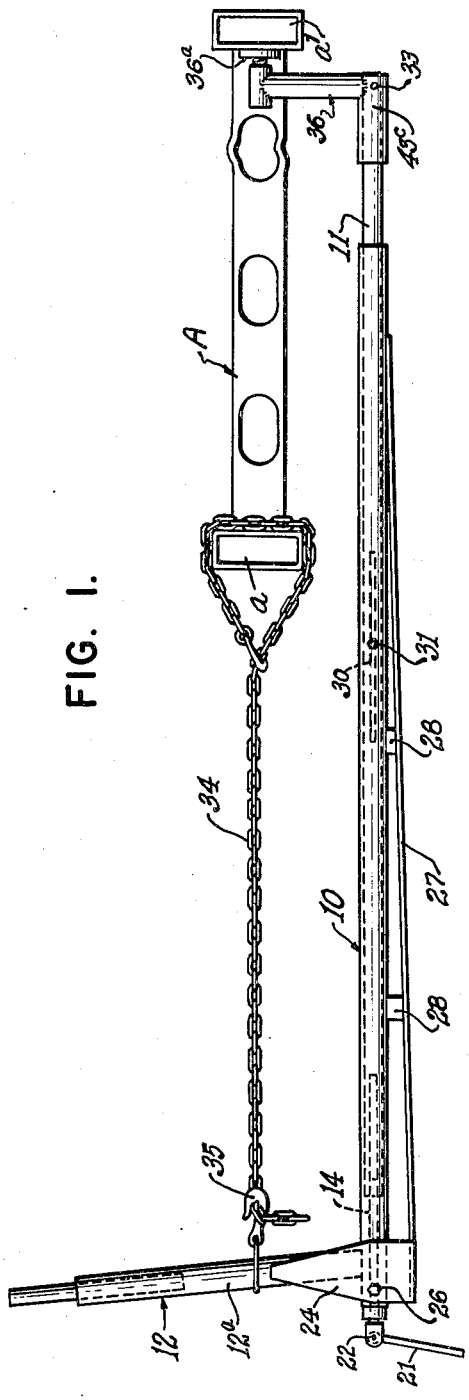
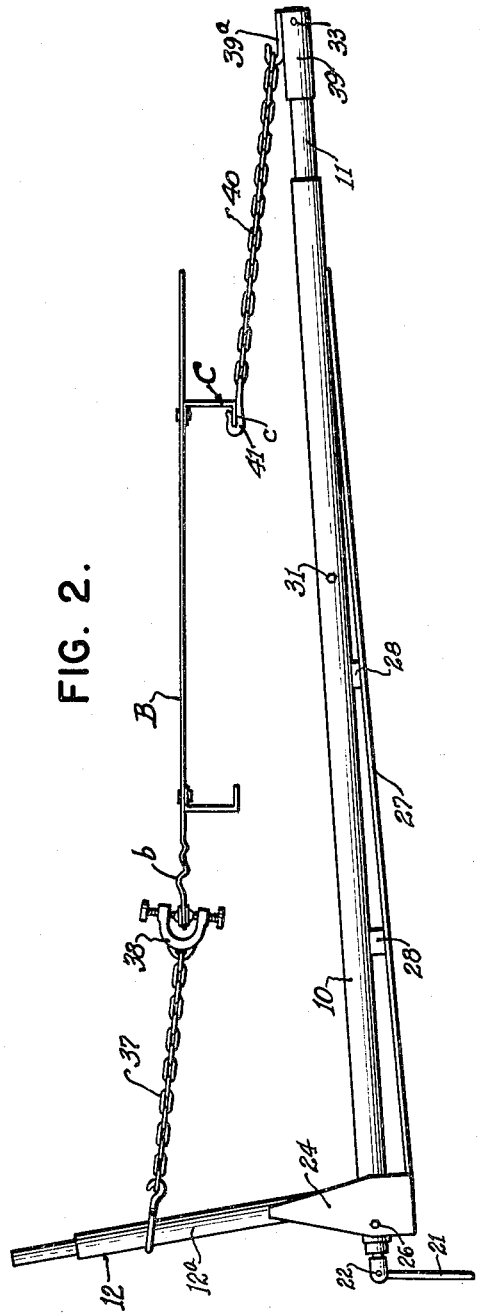
INVENTOR
Leonard Eck
BY Frank J. Schraeder Jr.
ATTORNEY Nov. 7, 1961 L. ECK 3,007,509
TOOL FOR REPAIRING DAMAGED AUTOMOBILE BODIES, ETC.
Filed June 18, 1958 2 Sheets-Sheet 2
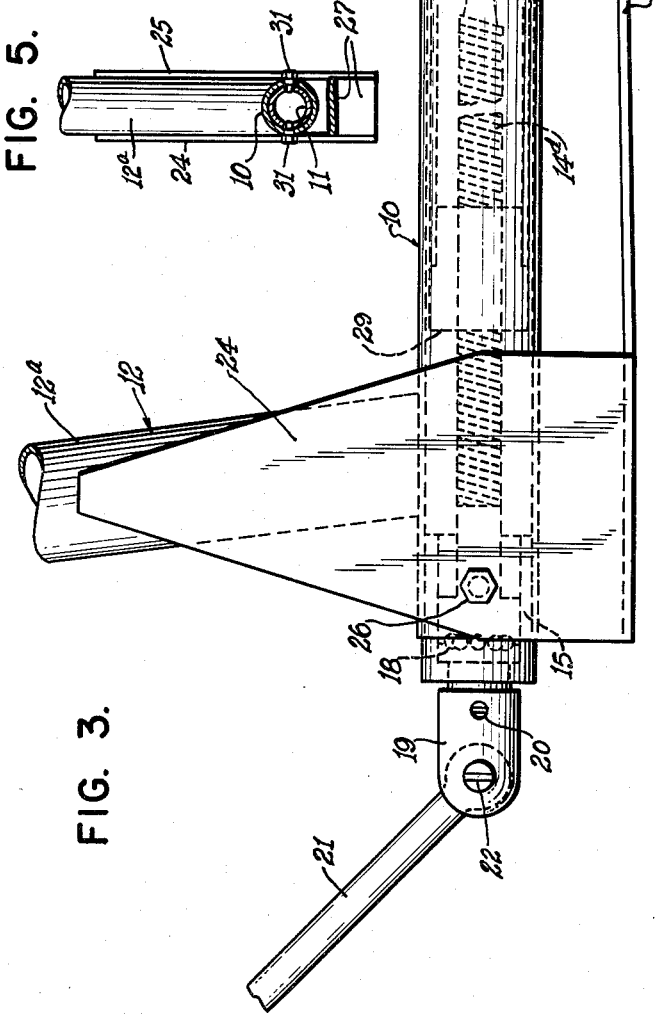
INVENTOR
Leonard Eck
BY
Frank J. Schraeder Jr.
ATTORNEY United States Patent Office 3,007,509
Patented Nov. 7, 1961

3,007,509
TOOL FOR REPAIRING DAMAGED
AUTOMOBILE BODIES, ETC.
Leonard Eck, 418 N. Hartup, McPherson, Kans.
Filed June 18, 1958, Ser. No. 742,944
5 Claims. (Cl. 153—32)

There are many different manually operable tools adapted to repair the sheet metal and some other parts of damaged automobiles, where the corrections may be effected by pushing, pulling or squeezing forces.

The present invention relates to this general type of tool and has for its purpose to create a tool that shall be very simple, light, sturdy, easily operated, and be effective in correcting a considerable variety of abnormalities.

In carrying out my invention I employ two long telescoped tubes the outer of which has at one end a radial arm and an axial screw shaft, while the inner tube is in screw threaded relation with the shaft; the shaft being capable of turning but with no capacity for lengthwise movement; while the inner tube can slide lengthwise but not turn in the outer tube. The inner tube protrudes from the opposite end of the outer tube and is adapted to carry any one of a plurality of accessories. The radial arm on the outer tube serves as an anchoring post for a chain or other accessory adapted to cooperate with the accessory on the inner tube to transmit the power of the screw to the work.

The various features of novelty will hereinafter be pointed out in the claims; but, for a full understanding of the invention and of its objects and advantages, reference may be had to the following detailed description taken in connection with the accompanying drawings, wherein:

FIG. 1 is a side elevation of a tool embodying the present invention applied to a bus cross frame to correct a deformity.

FIG. 2 is a view similar to FIG. 1, showing the tool applied to a damaged automobile floor for the purpose of straightening the same.

FIG. 3 is a side elevation of the tool on a much larger scale, with parts broken away.

FIG. 4 is a longitudinal section, on the same scale as FIG. 3, on an axial plane at right angles to the plane of the latter.

FIG. 5 is a section on line 5—5 of FIG. 3, but on a smaller scale than the latter.

FIG. 6 is a side elevation of one of the accessories, on the same scale as FIG. 5, showing only a fragment thereof, and FIG. 7 is plan view of the protruding end of the inner tube, showing in section the sleeve base member of an accessory on the same and also the pin for securing the base member to the tube.

Referring to FIGS. 1 and 2 of the drawings, 10 represents a long steel outer tube in telescoped relation with an inner tube 11. While the dimensions may be varied, I have found an outer tube having an outside diameter of one and three quarters inches and a length of about five and one half feet to be satisfactory. At what may be termed the head end of the tool is a radial arm 12 fixed to the outer tube. In this head end there is a screw shaft 14. The inner tube is in screw-threaded relation with this shaft and extends to and somewhat beyond the opposite end of the outer tube.

The structure just described in general terms is shown in detail in FIGS. 3–5.

In the head end of the outer tube is fixed a bearing housing 15. Within the outer end of this housing is a conventional ball bearing unit, consisting of a pair of bearing races 16 and 17 fixed in the housing, and a set of balls 18 between such races.

Extending axially into outer tube through the bearing unit is the aforesaid shaft 14. The shaft comprises a short cylindrical section 14$^a$ at the outer end, and a long main section 14$^b$ of larger diameter to provide at the juncture of the two sections a shoulder 14$^c$; this shoulder, through contact with the bearing races, preventing the shaft from backing out of the tube. Section 14$^b$ is provided with screw threads 14$^d$.

On the outer end of shaft 14 is a handle socket 19 held in place by set screws 20. This socket, through contact with the outer end of housing 15, prevents the screw shaft from being drawn into the outer tube. A handle 21 is connected at one end to socket 19 by a hinge pin 22.

Arm 12, referred to heretofore, is composed of a tube 12$^a$ of the same diameter as main body tube 10, resting on and fixed to the latter; together with a pair of steel plates 24 and 25 on opposite sides of the lower end of tube 12$^a$ and extending past tube 10 for a short distance. Thus the arm comprises a long section and a short section projecting in opposite directions from respectively above and below tube 10. Screws 26, 26, which secure the bearing housing in place also pass through plates 24 and 25. These two plates are more or less triangular, being wide at the free end of the short section of the arm and tapering to a very narrow width at their opposite ends along the long section of the arm. A tension-compression member in the form of a reenforcing strip of strap iron 27 is set between the plates at their wide ends and extended lengthwise of tube 10 to near the opposite end of the body structure where it is in welded contact with that tube 10. Spacers 28 are interposed at intervals along the reinforcing strip between it and the tube 10. The reenforcing strip is fixed at its ends in any convenient manner, preferably by welding, to plates 24 and 25 and to tube 10, respectively, while the spacers are in like manner fastened to tube 10 and to the reenforcing strip. Thus the main tube of the body structure has been transformed into a sturdy truss to act as a brace under either tension or compression, depending on whether the tool is used to stretch or squeeze an article under repair.

Inner tube 11 has fixed in its inner end a sleeve nut 29 which is engaged with the screw threads 14$^d$ on shaft 14. In order to prevent relative turning movements between tubes 10 and 11, the inner tube contains two diametrically opposed longitudinal slots 30 about one foot long and, extending into those slots, are cap screws 31 passing through the wall of the outer tube.

Inner tube 11 contains close to its outer end a pair of diametrically disposed holes 32 to receive a pin passing through a suitable accessory to secure the accessory to the inner tube; such a pin 33 being shown in FIG. 7. The holes in the inner tube and in the accessories are so situated that the accessory is caused to stand on the same side of the body structure or frame as the radial arm.

The tool may be used in many ways. In FIG. 1 one end of a chain 34 is connected to a hook 35 anchored on the radial arm 12 and looped about a member of a bus cross frame A, to be stretched. An accessory 36 provided with a shoe 36$^a$ is mounted on the free end of inner tube 11 in position to exert a thrust against a frame member $a^1$, parallel to the one to which the chain is attached. Now, when the screw is turned in the proper direction the chain is caused to exert a pull and accessory 36 is caused to exert a push in the opposite direction, thereby stretching the frame.

In FIG. 2 a chain 37 is anchored to the radial arm 12 and is provided with a C-clamp 38 that grips a marginal portion b of a crumpled automobile floor B. An accessory 39 provided with a hook 39ª is mounted on the inner tube. A chain 40 extends from the hook 39ª and has thereon a hook 41 which engages a part c of the automobile frame C on which the floor is supported. When the screw is turned in the proper direction the floor is stretched and flattened.

It will be seen that in the two examples of use the screw must be turned in the direction to push the inner tube farther out. By employing the proper accessories and turning the screw in the opposite direction a squeezing action may be exerted on a piece of work.

In FIG. 6 the accessory 43, similar to accessory 36, is equipped not only with a pad or shoe 43ª, similar to 36ª as in FIG. 1, but also with a hook 43ᵇ, either of which may be used as required; elements 43ª and 43ᵇ being preferably detachable and interchangeable on the accessory. By providing the accessory with a tubular or sleeve-like foot or base member 43ᶜ that fits easily on inner tube 11, attachment and detachment of the accessory is made easy and yet the accessory is very firmly supported on the body of the tool after the pin 33 has been applied.

It is believed that no further description of the operation of the tool is needed, since it may be used in any situation that may be handled by the prior tools of which I am aware and in any situation, I believe, where a manually operable tool of this general type may be useful.

While I have illustrated and described with particularity only a preferred form of my improved tool and only a few accessories, I do not desire to be limited to all of the details so illustrated and described; but intend to cover all forms and arrangements coming within the definitions of the invention constituting the appended claims.

I claim:

1. In a tool of the character described, the combination of a long outer tube, a shaft extending axially of the tube into one end of the same and mounted for rotary movements while held against lengthwise movements, a handle on the outer end of the shaft for turning the same, screw threads on the inner end of the shaft, an inner tube slidable lengthwise in but held against rotation with respect to the outer tube, the inner tube protruding from the opposite end of the outer tube, a nut fixed to the inner end of the inner tube and engaged with the threads on the shaft, a radial arm rigidly fixed to the first mentioned end of the outer tube, said radial arm having an extension crossing said outer tube and extending radially in the opposite direction from said outer tube as the main portion of said arm, and an elongated tension-compression member being fixed at one end thereof to the free end of said extension and being secured at its opposite end to said outer tube adjacent said opposite end thereof, said tension-compression member preventing binding of said tubes when the same are moved longitudinally to compress or stretch a work member connected to the free end of said inner tube and to the main portion of said arm.

2. A body member for a tool of the character described, comprising a long tube, a long, rigid, radial arm immovably fixed to the tube near one end of the latter and having a short section crossing the tube to lie on the opposite side of the tube from the main portion of the arm, a tension-compression member rigidly fixed at one end to the free end of said short arm section and extending along the tube to the opposite end of the tube where it is fixed to the tube, spacers arranged at intervals between the tension-compression member and the tube and fixed to both tube and tension-compression member, and a second tube telescopingly received within said first-mentioned tube and being extendable and retractable through the opposite end of said first-mentioned tube, said second tube and the main portion of said radial arm being adapted for connection to a work piece for removing deformations from said piece as said second tube is retracted or extended, said tension-compression member constituting a truss for preventing bending and binding of said tubes when the same are shifted longitudinally to stretch or compress a work piece.

3. A body member as set forth in claim 2, wherein the arm is composed of a tube extending throughout the length of the main portion, together with plates secured to that tube and extending to the tension-compression member.

4. A tool for stretching or compressing a work structure to remove deformation therefrom, comprising an outer tube, an inner tube telescopingly received within said outer tube, means for extending and retracting said inner tube through one of the ends of said outer tube, an arm rigidly fixed to the opposite end of said outer tube and having a main portion extending radially therefrom, said main portion and said inner tube being connectable to a work structure for stretching or compressing said structure as said inner tube is extended or retracted respectively, and a tension-compression member extending longitudinally of said outer tube to restrain bending of said outer tube in operation, said tension-compression member being fixed at one end to said outer tube adjacent said one end thereof and being rigidly secured at the opposite end thereof to a radial extension of said arm disposed on the side of said outer tube opposite from said main portion.

5. In a tool of the character described, an outer tube, an inner tube telescopingly received within said outer tube, means for extending and retracting said inner tube through one of the ends of said outer tube, connecting means provided by said outer and inner tubes at the remote ends thereof for connection to a work structure disposed alongside the telescoping tubes, a member rigidly fixed to the remote end of said outer tube and extending radially from said tube at a point diametrically opposite from the connecting means provided by said outer tube, and a tension-compression element being rigidly fixed at one end to the free end of said member and being secured at the opposite end thereof to said one end of said outer tube.

References Cited in the file of this patent
UNITED STATES PATENTS

| | | |
|---|---|---|
| 2,010,713 | Countryman | Aug. 6, 1935 |
| 2,606,467 | Desjarlais et al. | Aug. 12, 1952 |
| 2,736,359 | Bowman | Feb. 28, 1956 |
| 2,757,705 | Johnson | Aug. 7, 1956 |